US010321321B2

(12) United States Patent
Zeng (10) Patent No.: US 10,321,321 B2
(45) Date of Patent: Jun. 11, 2019

(54) METHOD AND DEVICE FOR DISPLAYING LOCKED INTERFACE AND MOBILE TERMINAL

(71) Applicant: BEIJING KINGSOFT INTERNET SECURITY SOFTWARE CO., LTD., Beijing (CN)

(72) Inventor: Yongchao Zeng, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 0 days.

(21) Appl. No.: 15/757,277

(22) PCT Filed: Aug. 12, 2016

(86) PCT No.: PCT/CN2016/094815
§ 371 (c)(1),
(2) Date: Mar. 2, 2018

(87) PCT Pub. No.: WO2017/050057
PCT Pub. Date: Mar. 30, 2017

(65) Prior Publication Data
US 2018/0270665 A1    Sep. 20, 2018

(30) Foreign Application Priority Data

Sep. 25, 2015    (CN) .......................... 2015 1 0621920

(51) Int. Cl.
*G06F 21/36*    (2013.01)
*G06F 21/45*    (2013.01)
(Continued)

(52) U.S. Cl.
CPC .......... *H04W 12/08* (2013.01); *G06F 3/0481* (2013.01); *G06F 21/36* (2013.01); *G06F 21/45* (2013.01);
(Continued)

(58) Field of Classification Search
CPC ...... H04W 12/08; G06F 3/0481; G06F 21/36; G06F 21/45; G06T 11/001;
(Continued)

(56) References Cited

U.S. PATENT DOCUMENTS 6,476,797 B1    11/2002    Kurihara et al.
2008/0303750 A1*    12/2008    Ludden ................ G09G 3/2092
345/55

(Continued)

FOREIGN PATENT DOCUMENTS

CN    191819505    9/2010
CN    102498465    6/2012
(Continued)

OTHER PUBLICATIONS

WIPO, ISR/WO for PCT/CN2016/094815, Aug. 12, 2016.
SIPO, Third Office Action for CN Application No. 201510621920, dated Sep. 17, 2018.

*Primary Examiner* — Charles N Appiah
*Assistant Examiner* — Nicole M Louis-Fils
(74) *Attorney, Agent, or Firm* — Hodgson Russ LLP (57) ABSTRACT

The present disclosure relates to a method and a device for displaying a locked interface, and a mobile terminal. The method includes: presenting an unlocking interface to a user, so that the user inputs an unlocking password through the unlocking interface; in a process of receiving the unlocking password, comparing a received part of the unlocking password with a set unlocking password to determine a correct degree value of the received part of the unlocking password; and displaying a locked content interface and/or the unlocking interface according to the correct degree value.

9 Claims, 7 Drawing Sheets

(51) Int. Cl.
*G06T 11/00* (2006.01)
*H04M 1/673* (2006.01)
*H04M 1/725* (2006.01)
*H04W 12/08* (2009.01)
*G06F 3/0481* (2013.01)

(52) U.S. Cl.
CPC ........... *G06T 11/001* (2013.01); *H04M 1/673* (2013.01); *H04M 1/72519* (2013.01); *G06T 2200/24* (2013.01); *H04M 2250/22* (2013.01)

(58) Field of Classification Search
CPC .......... G06T 2200/24; H04M 1/72519; H04M 1/673; H04M 2250/22
USPC ......................................................... 455/411
See application file for complete search history.

(56) References Cited

U.S. PATENT DOCUMENTS

| | | | | |
|---|---|---|---|---|
| 2010/0277429 | A1* | 11/2010 | Day | G06F 3/0416 345/173 |
| 2013/0069893 | A1* | 3/2013 | Brinda | G06F 3/0488 345/173 |
| 2015/0346903 | A1* | 12/2015 | O'Connor | G09G 5/003 345/173 |

FOREIGN PATENT DOCUMENTS

| | | |
|---|---|---|
| CN | 104035706 | 9/2014 |
| CN | 104571531 | 4/2015 |
| CN | 105373288 | 3/2016 |

\* cited by examiner

METHOD AND DEVICE FOR DISPLAYING LOCKED INTERFACE AND MOBILE TERMINAL

CROSS-REFERENCE TO RELATED APPLICATIONS

This application is a U.S. national phase application of International Application No. PCT/CN2016/094815, filed Aug. 12, 2016, which claims priority to and benefits of Chinese Patent Application No. 201510621920.X, filed with the State Intellectual Property Office of P. R. China on Sep. 25, 2015, the entire contents of which are incorporated herein by reference.

FIELD

The present disclosure relates to a mobile terminal technology field, and more particularly, to a method and a device for displaying a locked interface, and a mobile terminal.

BACKGROUND

In the related art, one of unlocking methods of a mobile terminal or an application (APP) installed on the mobile terminal is to display an unlocking interface on a screen of the mobile terminal and to remove the unlocking interface when a user inputs a correct unlocking pattern or password on the screen.

However, with the above method, the user cannot see content of the locked interface until the unlocking is finished, the user experience is poor.

SUMMARY

Embodiments of the present disclosure provide a method for displaying a locked interface, including: presenting an unlocking interface to a user, so that the user inputs an unlocking password through the unlocking interface; in a process of receiving the unlocking password, comparing a received part of the unlocking password with a set unlocking password to determine a correct degree value of the received part of the unlocking password; and displaying a locked content interface and/or the unlocking interface according to the correct degree value.

Embodiments of the present disclosure provide a mobile terminal, including: a housing, a processor, a receiver, a memory, a circuit board and a power supply circuit. The circuit board is enclosed by the housing. The processor and the memory are positioned on the circuit board. The power supply circuit is configured to provide power for respective circuits or components of the mobile terminal. The memory is configured to store executable program codes. The processor is configured to run a program corresponding to the executable program codes by reading the executable program codes stored in the memory, to perform the method for displaying the locked interface according to any one of the above implementations. The receiver is configured to receive the unlocking password.

Embodiments of the present disclosure provide a storage medium. The storage medium is configured to store one or more modules. When the one or more modules are executed by an electronic device, cause the electronic device to perform the above method for displaying the locked interface.

Embodiments of the present disclosure provide an application program. The application program performs the above method for displaying the locked interface.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. Instead, they are merely examples of apparatuses and methods consistent with aspects related to the present disclosure as recited in the appended claims.

Figure 1:
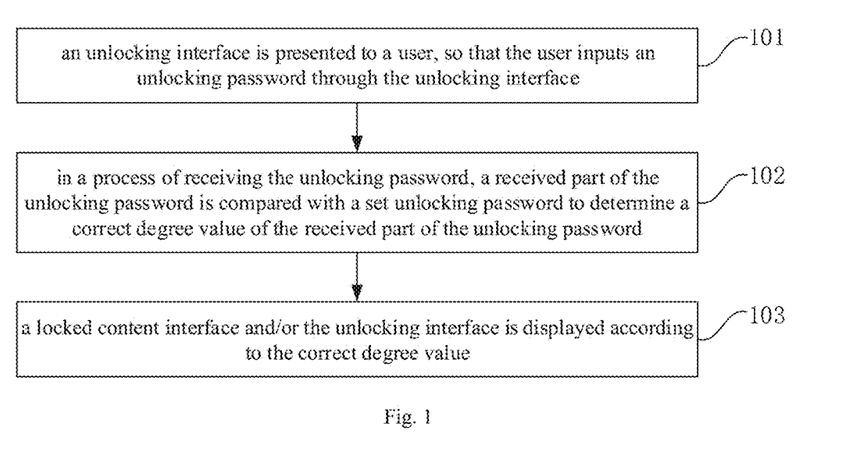
FIG. 1 is a flow chart of a method for displaying a locked interface according to an embodiment of the present disclosure.

FIG. 1 is a flow chart of a method for displaying a locked interface according to an embodiment of the present disclosure. As illustrated in FIG. 1, the method for displaying the locked interface may include followings.

At block 101, an unlocking interface is presented to a user, so that the user may input an unlocking password through the unlocking interface.

At block 102, in a process of receiving the unlocking password, a received part of the unlocking password is compared with a set unlocking password to determine a correct degree value of the received part of the unlocking password.

In addition, a mobile terminal may receive and save the unlocking password set by the user before the unlocking password is received. The unlocking password may include one or a combination of a biometric information password, a digital password, a gesture password, a text password, a voice password and a picture password. The present disclosure does not limit the form of the above unlocking password. The mobile terminal may be a smart terminal device such as a smart phone, a smart watch or a tablet computer. The present disclosure does not limit the form of the above mobile terminal.

The biometric information password may include a fingerprint password and/or an eye iris.

In this embodiment, in the process of receiving the unlocking password, the received part of the unlocking password is compared with the set unlocking password to determine the correct degree value of the received part of the unlocking password by the mobile terminal. For example, assuming that the unlocking password set by the user is "123456", in the process of the mobile terminal receiving the unlocking password, when the received part of the unlocking password is "12", then "12" can be compared with "123456" to determine that the correct degree value of the received part of the above unlocking password reaches 33.3%. When the unlocking password is continued to be received, and the received part of the unlocking password reaches "123", then "123" can be compared with "123456" to determine that the correct degree value of the received part of the above unlocking password reaches 50%.

At block 103, a locked content interface and/or the unlocking interface is displayed according to the correct degree value.

In an implementation, the act of displaying the locked content interface and/or the unlocking interface according to the correct degree value may be that, when the correct degree value is less than the first threshold value, the unlocking interface is displayed, and when the correct degree reaches 100%, the locked content interface is displayed.

In an implementation, the above first threshold value may be set according to implementation requirements and/or system performances, and the present disclosure does not limit a size of the first threshold value. For example, the first threshold value may be 10%.

In other words, when the correct degree value of the received part of the unlocking password is less than the first threshold value, the mobile terminal only displays the unlocking interface. When the correct degree value of the received part of the unlocking password reaches 100%, i.e., exactly correct, the mobile terminal displays the locked content interface.

Figure 2:
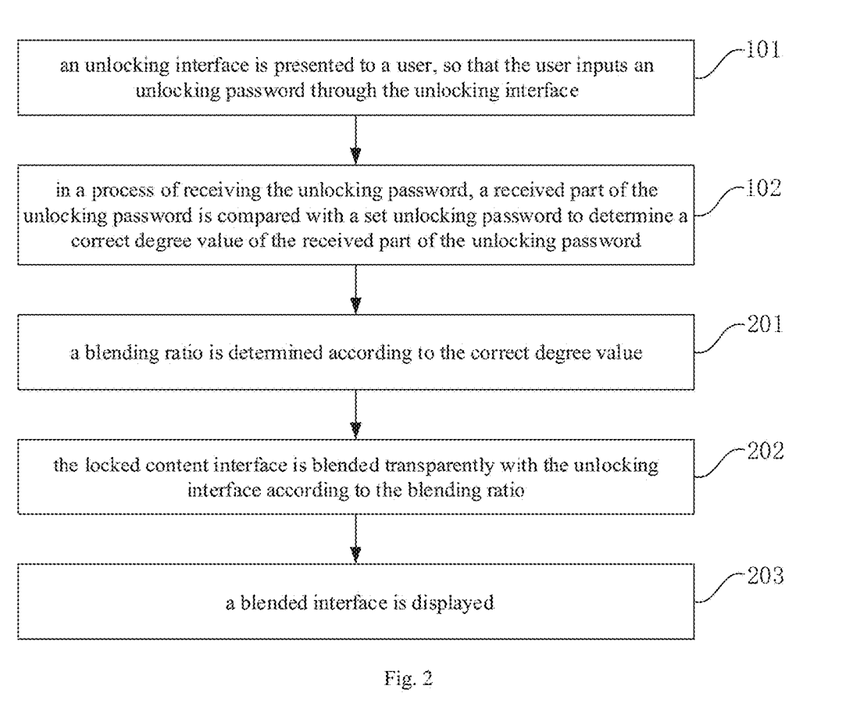
FIG. 2 is a flow chart of a method for displaying a locked interface according to another embodiment of the present disclosure.

FIG. 2 is a flow chart of a method for displaying a locked interface according to another embodiment of the present disclosure. As illustrated in FIG. 2, block 103 may include followings.

At block 201, a blending ratio is determined according to the correct degree value.

At block 202, the locked content interface is blended transparently with the unlocking interface according to the blending ratio.

At block 203, a blended interface is displayed.

In this embodiment, the act of determining the blending ratio according to the correct degree value may be that, the correct degree value is proportional to the blending ratio. In other words, the greater the correct degree value is, the greater the blending ratio is, and correct degree values in a continuous interval correspond to a blending ratio.

For example, when the above correct degree value reaches 75%, it can be determined that the above blending ratio is 15%, and then the locked interface can be color blended with the unlocking interface according to the ratio 15%. When the above correct degree value reaches 90%, it can be determined that the above blending ratio is 30%, and then the locked interface can be color blended with the unlocking interface according to the ratio 30%. When the above correct degree value reaches 100%, it can be determined that the above blending ratio is 100%, and then the locked interface can be color blended with the unlocking interface according to the ratio 100% (i.e., the locked interface is displayed completely), so that the locked interface can be displayed gradually and smoothly.

FIG. 3(*a*) to FIG. 3(*d*) are schematic diagrams illustrating a display process of a locked interface according to an embodiment of the present disclosure. Referring to FIG. 3(*a*) to FIG. 3(*d*), FIG. 3(*a*) illustrates an unlocking interface, and it can be seen from FIG. 3(*a*) that, the present embodiment takes the gesture password as an example. FIG. 3(*b*) illustrates a schematic diagram in which in the process of receiving the unlocking password, the locked content interface is blended with the unlocking interface according to the ratio 15% when the correct degree value of the received part of the unlocking password reaches 75%. FIG. 3(*c*) illustrates a schematic diagram in which in the process of receiving the unlocking password, the locked content interface is blended with the unlocking interface according to the ratio 30% when the correct degree value of the received part of the unlocking password reaches 90%. FIG. 3(*d*) illustrates a schematic diagram in which the locked content interface is completely displayed when the correct degree value of the received part of the unlocking password reaches 100%.

Figure 4:
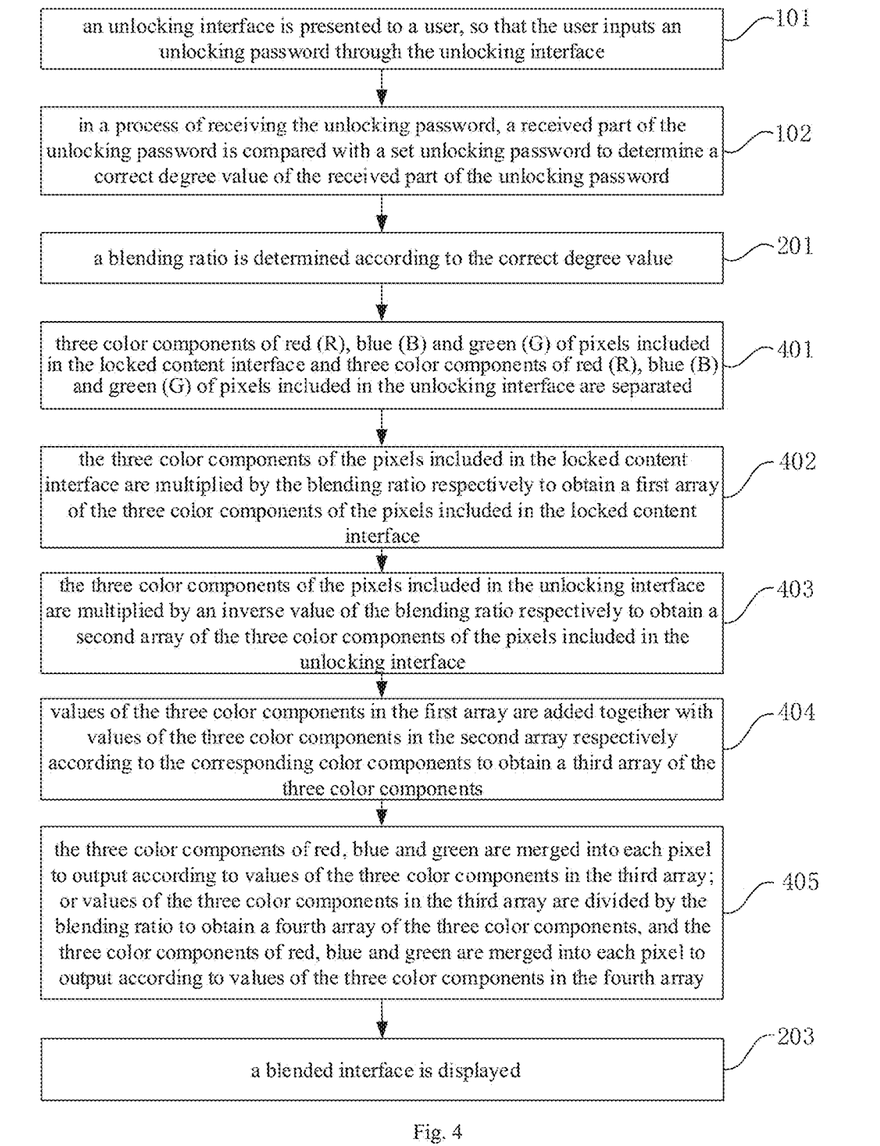
FIG. 4 is a flow chart of a method for displaying a locked interface according to another embodiment of the present disclosure.

FIG. 4 is a flow chart of a method for displaying a locked password according to another embodiment of the present disclosure. In this embodiment, the color blending method in block 202 is described, and the color blending method used in the present embodiment is a blending (Alpha Blending). As illustrated in FIG. 4, block 202 may include followings.

At block 401, three color components of red (R), blue (B) and green (G) of pixels included in the locked content interface are separated and three color components of red (R), blue (B) and green (G) of pixels included in the unlocking interface are separated.

At block 402, the three color components of the pixels included in the locked content interface are multiplied by the blending ratio respectively to obtain a first array of the three color components of the pixels included in the locked content interface.

At block 403, the three color components of the pixels included in the unlocking interface are multiplied by an inverse value of the blending ratio respectively to obtain a second array of the three color components of the pixels included in the unlocking interface.

At block 404, values of the three color components in the first array are added together with values of the three color components in the second array respectively according to the corresponding color components to obtain a third array of the three color components.

At block 405, the three color components of red, blue and green are merged into each pixel to output according to values of the three color components in the third array; or values of the three color components in the third array are divided by the blending ratio to obtain a fourth array of the three color components, and the three color components of red, blue and green are merged into each pixel to output according to values of the three color components in the fourth array.

Figure 5:
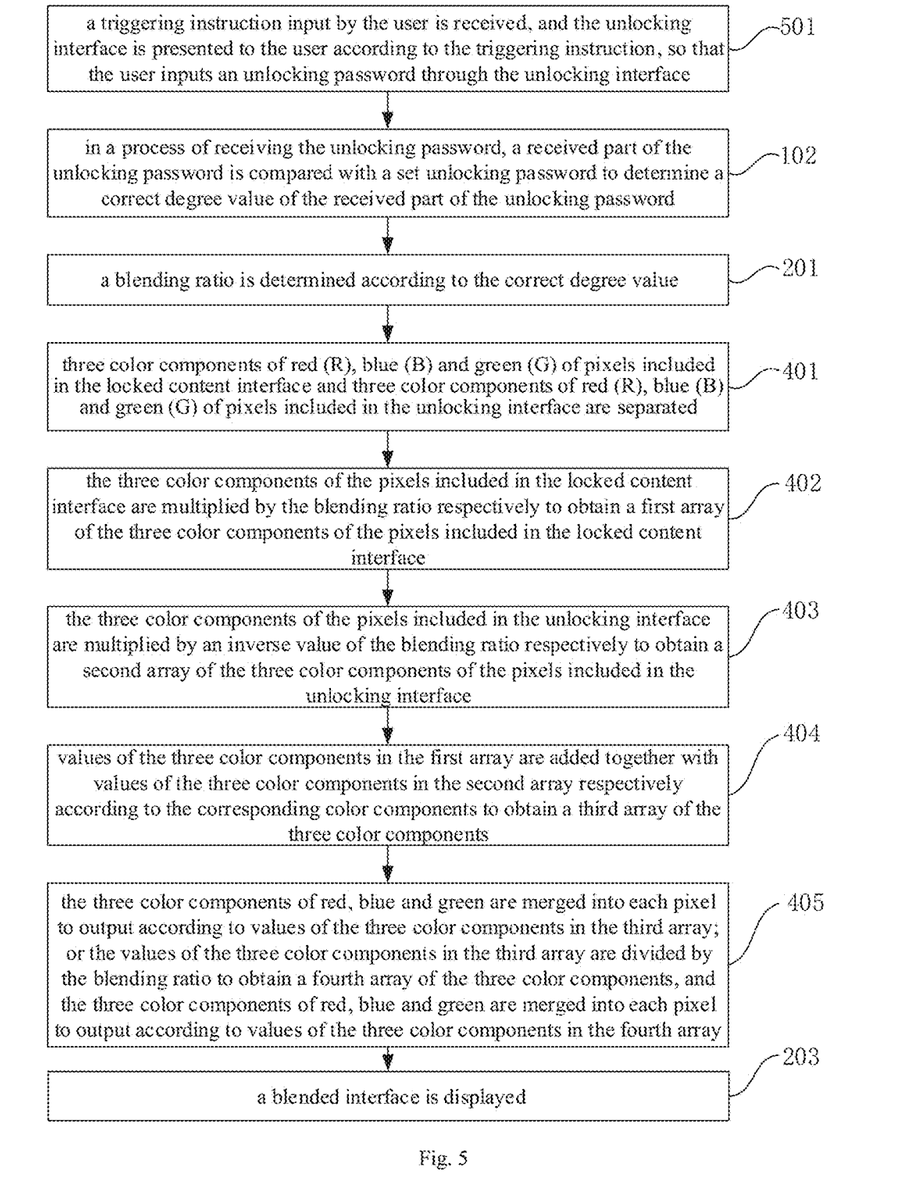
FIG. 5 is a flow chart of a method for displaying a locked interface according to another embodiment of the present disclosure.

FIG. 5 is a flow chart of a method for displaying a locked password according to another embodiment of the present disclosure. As illustrated in FIG. 5, at block 101, the act of presenting an unlocking interface to the user may include follows.

At block 501, a triggering instruction input by the user is received, and the unlocking interface is presented to the user according to the triggering instruction.

The triggering instruction may be input by the user by pressing a power on/off button of the mobile terminal, or may be input by the user by clicking a locked icon on the screen. The present disclosure does not limit the form of the triggering instruction input by the user.

In other words, in the present embodiment, after the triggering instruction input by the user is received, the unlocking interface is presented to the user according to the triggering instruction.

With the above method for displaying the locked interface, the unlocking interface is presented to the user, so that the user inputs the unlocking password through the unlocking interface, and in the process of receiving the unlocking password, the received part of the unlocking password is compared with the set unlocking password to determine the correct degree value of the received part of the unlocking password, and then the locked content interface and/or the unlocking interface is displayed according to the correct degree value, thus it can be achieved that, in the process of unlocking, the locked interface is displayed gradually, the unlocking interface and the locked interface are converted seamlessly, and the user experience of unlocking the mobile terminal or the APP installed on the mobile terminal is improved.

Figure 6:
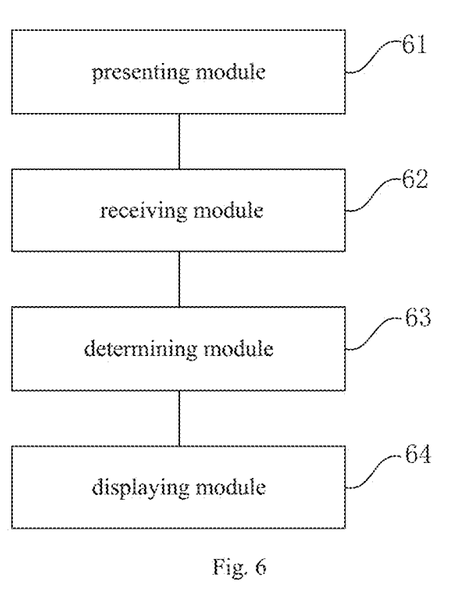
FIG. 6 is a block diagram of a device for displaying a locked interface according to an embodiment of the present disclosure.

FIG. 6 is a block diagram of a device for displaying a locked interface according to an embodiment of the present disclosure. The device for displaying the locked interface in the present embodiment may be as a mobile terminal, a part of the mobile terminal or an APP installed on the mobile terminal to implement operations of the method for displaying the locked interface provided by the present disclosure. The mobile terminal may be a smart terminal device such as a smart phone, a smart watch or a tablet computer. The present disclosure does not limit the form of the above mobile terminal.

As illustrated in FIG. 6, the device for displaying the locked interface may include a presenting module 61, a receiving module 62, a determining module 63 and a displaying module 64.

The presenting module 61 is configured to present an unlocking interface to a user, so that the user may input an unlocking password through the unlocking interface.

The receiving module 62 is configured to receive the unlocking password.

The determining module 63 is configured to compare a received part of the unlocking password with a set unlocking password to determine a correct degree value of the received part of the unlocking password in a process of receiving the unlocking password through the receiving module 62. In the present embodiment, in the process of receiving the unlocking password through the receiving module 62, the determining module 63 compares the received part of the unlocking password with the set unlocking password to determine the correct degree value of the received part of the unlocking password. For example, assuming that the unlocking password set by the user is "123456", in the process of receiving the unlocking password through the receiving module 62, when the received part of the unlocking password is "12", then "12" can be compared with "123456" to determine that the correct degree value of the received part of the above unlocking password reaches 33.3%. When the unlocking password is continued to be received, and the received part of the unlocking password reaches "123", then "123" can be compared with "123456" to determine that the correct degree value of the received part of the above unlocking password reaches 50%.

The displaying module 64 is configured to display a locked content interface and/or the unlocking interface according to the correct degree value determined by the determining module 63.

The displaying module 64 is configured to: display the unlocking interface when the correct degree value is less than a first threshold value, and display the locked content interface when the correct degree reaches 100%.

In an implementation, the above first threshold value may be set according to implementation requirements and/or system performances, and the present disclosure does not limit a size of the first threshold value. For example, the first threshold value may be 10%.

In other words, when the correct degree value of the received part of the unlocking password is less than the first threshold value, the displaying module 64 only displays the unlocking interface. When the correct degree value of the received part of the unlocking password reaches 100%, i.e., exactly correct, the displaying module 64 displays the locked content interface. In this embodiment, the determining module 63 is further configured to determine a blending ratio according to the correct degree value determined by the determining module 63. The displaying module 64 is further configured to blend transparently the locked content interface with the unlocking interface according to the blending ratio determined by the determining module 63 to display a blended interface.

In this embodiment, the correct degree value determined by the determining module 63 is proportional to the blending ratio. In other words, the greater the correct degree value is, the greater the blending ratio is, and correct degree values in a continuous interval correspond to a blending ratio.

For example, when the above correct degree value reaches 75%, the determining module 63 can determine that the above blending ratio is 15%, at this time, the displaying module 64 can blend the locked interface with the unlocking interface according to the ratio 15%. When the above correct degree value reaches 90%, the determining module 63 can determine that the above blending ratio is 30%, at this time, the displaying module 64 can blend the locked interface with the unlocking interface according to the ratio 30%. When the above correct degree value reaches 100%, the determining module 63 can determine that the above blending ratio is 100%, at this time, the displaying module 64 can blend the locked interface with the unlocking interface (i.e., the locked interface is displayed completely) according to the ratio 100%, so that the locked interface can be displayed gradually and smoothly.

Figure 3A:
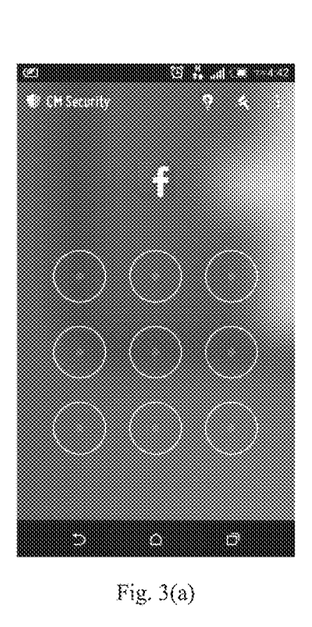
FIG. 3(a) to FIG. 3(d) are schematic diagrams illustrating a display process of a locked interface according to an embodiment of the present disclosure.
Figure 3B:
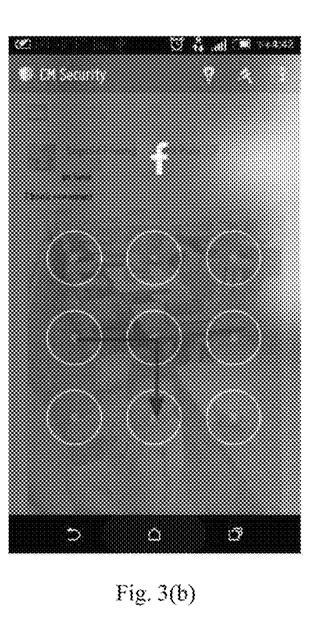
Figure 3C:
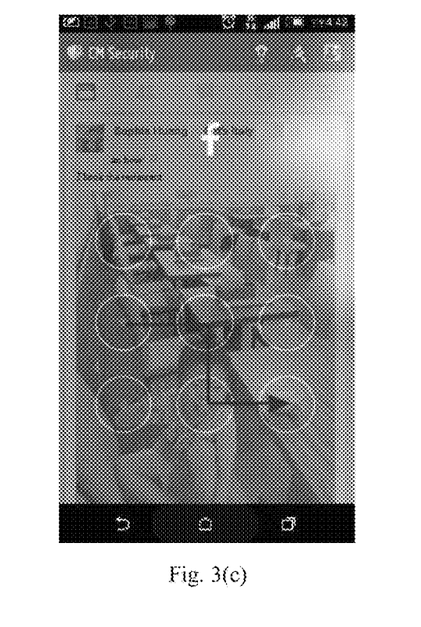
Figure 3D:
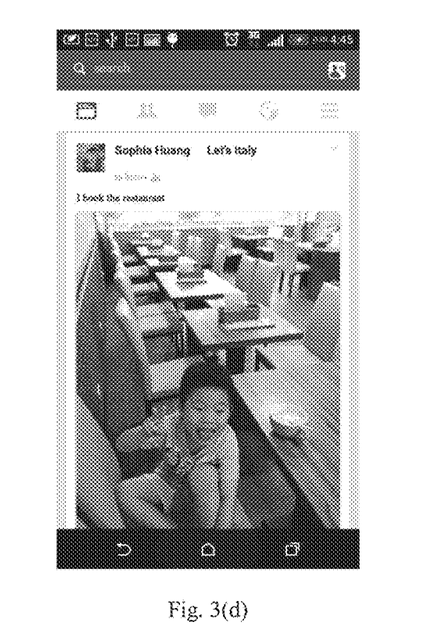

FIG. 3(a) to FIG. 3(d) are schematic diagrams illustrating a display process of a locked interface according to an embodiment of the present disclosure. Referring to FIG. 3(a) to FIG. 3(d), FIG. 3(a) illustrates an unlocking interface, and it can be seen from FIG. 3(a) that, the present embodiment takes the gesture password as an example. FIG. 3(b) illustrates a schematic diagram in which in the process of receiving the unlocking password, the locked content interface is blended with the unlocking interface according to the ratio 15% when the correct degree value of the received part of the unlocking password reaches 75%. FIG. 3(c) illustrates a schematic diagram in which in the process of receiving the unlocking password, the locked content interface is blended with the unlocking interface according to the ratio 30% when the correct degree value of the received part of the unlocking password reaches 90%. FIG. 3(d) illustrates a schematic diagram in which the locked content interface is completely displayed when the correct degree value of the received part of the unlocking password reaches 100%.

In this embodiment, the presenting module 61 is configured to receive a triggering instruction input by the user, and to present the unlocking interface to the user according to the triggering instruction. In other words, in the present embodiment, the presenting module 61 can present the unlocking module to the user after the triggering instruction input by the user is received.

The triggering instruction may be input by the user by pressing a power on/off button of the mobile terminal, or may be input by the user by clicking a locked icon on the screen. The present disclosure does not limit the form of the triggering instruction input by the user.

Figure 7:
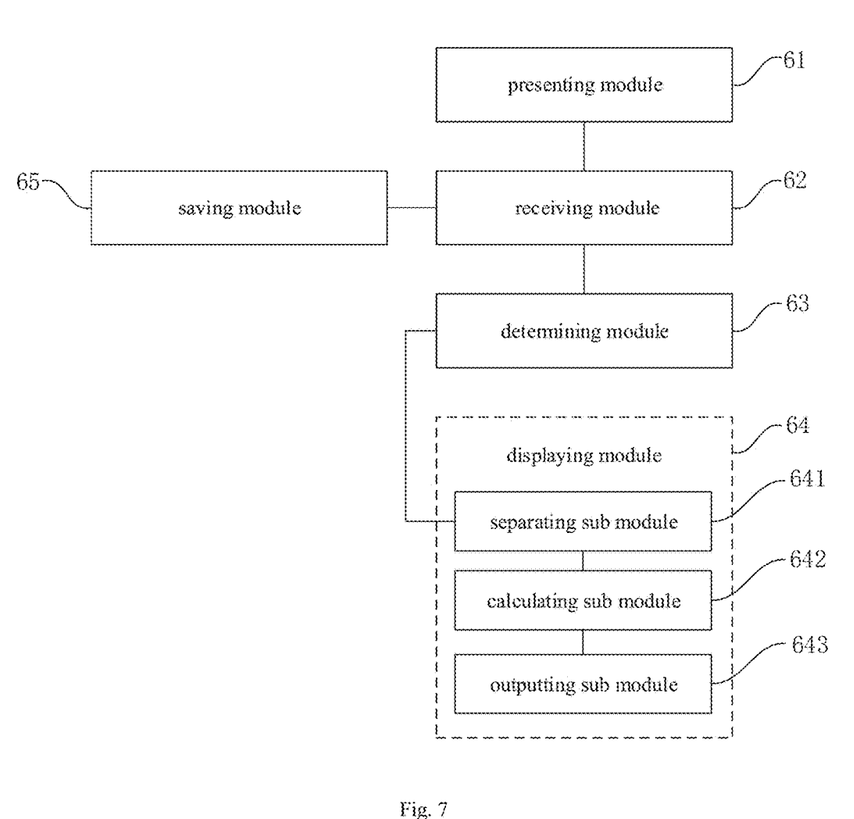
FIG. 7 is a block diagram of a device for displaying a locked interface according to another embodiment of the present disclosure.

FIG. 7 is a block diagram of a device for displaying a locked interface according to another embodiment of the present disclosure. Compared with the device for displaying the locked interface illustrated in FIG. 6, in the present disclosure, the difference lies in that the displaying module 64 includes a separating sub module 641, a calculating sub module 642 and an outputting sub module 643.

The separating sub module 641 is configured to separate three color components of red (R), blue (B) and green (G) of pixels included in the locked content interface and three color components of red (R), blue (B) and green (G) of pixels included in the unlocking interface.

The calculating sub module 642 is configured to: multiply the three color components of the pixels included in the locked content interface by the blending ratio respectively to obtain a first array of the three color components of the pixels included in the locked content interface, multiply the three color components of the pixels included in the unlocking interface by an inverse value of the blending ratio respectively to obtain a second array of the three color components of the pixels included in the unlocking interface, and add values of the three color components in the first array together with values of the three color components in the second array respectively according to the corresponding color components to obtain a third array of the three color components.

The outputting sub module 643 is configured to merge the three color components of red, blue and green into each pixel to output according to values of the three color components in the third array obtained from the calculating sub module 642; or divide values of the three color components in the third array by the blending ratio to obtain a fourth array of the three color components, and merge the three color components of red, blue and green into each pixel to output according to values of the three color components in the fourth array.

The device for displaying the locked interface illustrated in FIG. 7 further includes a saving module 65.

The receiving module 62 is configured to receive the unlocking password set by the user before the unlocking password is received. The unlocking password may include one or a combination of a biometric information password, a digital password, a gesture password, a text password, a voice password and a picture password. The present disclosure does not limit the form of the above unlocking password. The biometric information password may include a fingerprint password and/or an eye iris.

The saving module 65 is further configured to save the unlocking password received by the receiving module 62.

With the above device for displaying the locked interface, the presenting module 61 presents the unlocking interface to the user, so that the user inputs the unlocking password through the unlocking interface, and in the process of receiving the unlocking password through the receiving module 62, the determining module 63 compares the received part of the unlocking password with the set unlocking password to determine the correct degree value of the received part of the unlocking password, and then the displaying module 64 displays the locked content interface and/or the unlocking interface according to the correct degree value, thus it can be achieved that, in the process of unlocking, the locked interface is displayed gradually, the unlocking interface and the locked interface are converted seamlessly, and the user experience of unlocking the mobile terminal or the APP installed on the mobile terminal is improved.

Figure 8:
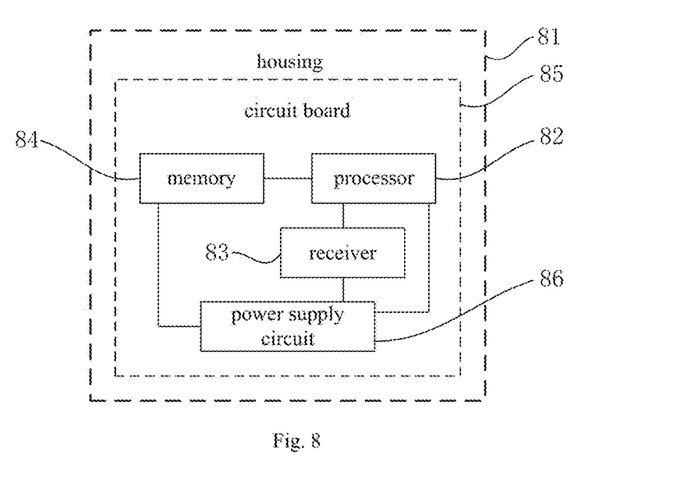
FIG. 8 is a block diagram of a mobile terminal according to an embodiment of the present disclosure.

FIG. 8 is a block diagram of a mobile terminal according to an embodiment of the present disclosure. The mobile terminal in the present embodiment can implement operations of the method for displaying the locked interface provided by the present disclosure. The mobile terminal may be a smart terminal device such as a smart phone, a smart watch, or a tablet computer. The present disclosure does not limit the form of the above mobile terminal.

As illustrated in FIG. 8, the mobile terminal includes a housing 81, a processor 82, a receiver 83, a memory 84, a circuit board 85 and a power supply circuit 86. The circuit board 85 is enclosed by the housing 81. The processor 82 and the memory 84 are positioned on the circuit board 85. The power supply circuit 86 is configured to provide power for respective circuits or components of the mobile terminal. The memory 84 is configured to store executable program codes. The processor 82 is configured to run a program corresponding to the executable program codes by reading the executable program codes stored in the memory 84, to perform operations: presenting an unlocking interface to a user, so that the user inputs an unlocking password through the unlocking interface, in a process of the receiver 83 receiving the unlocking password, comparing a received part of the unlocking password with a set unlocking password to determine a correct degree value of the received part of the unlocking password, and displaying a locked content interface and/or the unlocking interface according to the correct degree value.

The receiver 83 is configured to receive the unlocking password.

In this embodiment, in the process of receiving the unlocking password through the receiver 83, the processor 82 compares the received part of the unlocking password with the set unlocking password to determine the correct degree value of the received part of the unlocking password. For example, assuming that the unlocking password set by the user is "123456", in the process of receiving the unlocking password through the receiver 83, when the received part of the unlocking password is "12", "12" can be compared with "123456", and the processor 82 can determine that the correct degree value of the received part of the above unlocking password reaches 33.3%. When the unlocking password is continued to be received, and the received part of the unlocking password reaches "123", "123" can be compared with "123456", and the processor 82 can determine that the correct degree value of the received part of the above unlocking password reaches 50%.

The processor 82 is configured to: display the unlocking interface when the correct degree value is less than a first threshold value, and display the locked content interface when the correct degree reaches 100%.

In an implementation, the above first threshold value may be set according to implementation requirements and/or system performances, and the present disclosure does not limit a size of the first threshold value. For example, the first threshold value may be 10%.

In other words, when the correct degree value of the received part of the unlocking password is less than the first threshold value, the processor 82 only displays the unlocking interface. When the correct degree value of the received part of the unlocking password reaches 100%, i.e., exactly correct, the processor 82 displays the locked content interface.

In this embodiment, the processor 82 is configured to: determine the blending ratio according to the correct degree value, and blend transparently the locked content interface with the unlocking interface according to the blending ratio to display a blended interface.

In this embodiment, the correct degree value determined by the processor 82 is proportional to the blending ratio. In other words, the greater the correct degree value is, the greater the blending ratio is, and correct degree values in a continuous interval correspond to a blending ratio.

For example, when the above correct degree value reaches 75%, the processor 82 can determine that the above blending ratio is 15%, at this time, the processor 82 can blend the locked interface with the unlocking interface according to the ratio 15%. When the above correct degree value reaches 90%, the processor 82 can determine that the above blending ratio is 30%, at this time, the processor 82 can blend the locked interface with the unlocking interface according to the ratio 30%. When the above correct degree value reaches 100%, the processor 82 can determine that the above blending ratio is 100%, at this time, the processor 82 can blend the locked interface with the unlocking interface (i.e., the locked interface is displayed completely) according to the ratio 100%, so that the locked interface can be displayed gradually and smoothly.

FIG. 3(*a*) to FIG. 3(*d*) are schematic diagrams illustrating a display process of a locked interface according to an embodiment of the present disclosure. Referring to FIG. 3(*a*) to FIG. 3(*d*), FIG. 3(*a*) illustrates an unlocking interface, and it can be seen from FIG. 3(*a*) that, the present embodiment takes the gesture password as an example. FIG. 3(*b*) illustrates a schematic diagram in which in the process of receiving the unlocking password, the locked content interface is blended with the unlocking interface according to the ratio 15% when the correct degree value of the received part of the unlocking password reaches 75%. FIG. 3(*c*) illustrates a schematic diagram in which in the process of receiving the unlocking password, the locked content interface is blended with the unlocking interface according to the ratio 30% when the correct degree value of the received part of the unlocking password reaches 90%. FIG. 3(*d*) illustrates a schematic diagram in which the locked content interface is completely displayed when the correct degree value of the received part of the unlocking password reaches 100%.

In this embodiment, the processor 82 is configured to: receive a triggering instruction input by the user, and present the unlocking interface to the user according to the triggering instruction. In other words, in the present embodiment, the processor 82 can present the unlocking interface to the user according to the triggering instruction after the triggering instruction input by the user is received.

The triggering instruction may be input by the user by pressing a power on/off button of the mobile terminal, or may be input by the user by clicking a locked icon on the screen. The present disclosure does not limit the form of the triggering instruction input by the user.

In the present disclosure, the act of the processor 82 blending transparently the locked content interface with the unlocking interface according to the blending ratio may include followings. The processor 82 is configured to separate three color components of red (R), blue (B) and green (G) of pixels included in the locked content interface and three color components of red (R), blue (B) and green (G) of pixels included in the unlocking interface, multiply the three color components of the pixels included in the locked content interface by the blending ratio respectively to obtain a first array of the three color components of the pixels included in the locked content interface, multiply the three color components of the pixels included in the unlocking interface by an inverse value of the blending ratio respectively to obtain a second array of the three color components of the pixels included in the unlocking interface, add values of the three color components in the first array together with values of the three color components in the second array respectively according to the corresponding color components to obtain a third array of the three color components, merge the three color components of red, blue and green into each pixel to output according to values of the three color components in the third array obtained from the calculating sub module 642, or divide values of the three color components in the third array by the blending ratio to obtain a fourth array of the three color components, and merge the three color components of red, blue and green into each pixel to output according to values of the three color components in the fourth array.

In addition, the receiver 83 is configured to receive the unlocking password set by the user before the unlocking password is received. The unlocking password may include one or a combination of a biometric information password, a digital password, a gesture password, a text password, a voice password and a picture password. The present disclosure does not limit the form of the above unlocking password. The biometric information password may include a fingerprint password and/or an eye iris.

The processor 82 is further configured to save the unlocking password received by the receiver 83.

With the above mobile terminal, the processor 82 presents the unlocking interface to the user, so that the user inputs the unlocking password through the unlocking interface, and in the process of receiving the unlocking password through the receiver 83, the processor 82 compares the received part of the unlocking password with the set unlocking password to determine the correct degree value of the received part of the unlocking password, and then displays the locked content interface and/or the unlocking interface according to the correct degree value, thus it can be achieved that, in the process of unlocking, the locked interface is displayed gradually, the unlocking interface and the locked interface are converted seamlessly, and the user experience of unlocking the mobile terminal or the APP installed on the mobile terminal is improved.

In addition, embodiments of the present disclosure provide a storage medium. The storage medium stores one or more modules. When the one or more modules are executed by an electronic device, cause the electronic device to perform the method for displaying the locked interface according to any one of the above embodiments.

In addition, embodiments of the present disclosure provide an application program. The application program performs the method for displaying the locked interface according to any one of the above embodiments when it is executed.

It should be noted that, in descriptions of the present disclosure, terms such as "first" and "second" are used herein for purposes of description and are not intended to indicate or imply relative importance or significance or to imply the number of indicated technical features. In addition, unless specified otherwise, "a plurality of" means two or more than two.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for displaying a locked interface, comprising:
   presenting an unlocking interface to a user, so that the user inputs an unlocking password through the unlocking interface;
   in a process of receiving the unlocking password, comparing a received part of the unlocking password with a set unlocking password to determine a correct degree value of the received part of the unlocking password; and
   displaying a locked content interface and/or the unlocking interface according to the correct degree value,
   wherein displaying a locked content interface and/or the unlocking interface according to the correct degree value comprises:
     displaying the unlocking interface when the correct degree value is less than a first threshold value, where the first threshold value is less than 100%;
     determining a blending ratio according to the correct degree value when the correct degree value is between the first threshold value and 100%, and blending transparently the locked content interface with the unlocking interface according to the blending ratio to display a blended interface; and
     displaying the locked content interface when the correct degree reaches 100%;
   wherein, blending transparently the locked content interface with the unlocking interface according to the blending ratio to display a blended interface comprises:
     separating three color components of red, blue and green of pixels comprised in the locked content interface and three color components of red, blue and green of pixels comprised in the unlocking interface;
     multiplying the three color components of the pixels comprised in the locked content interface by the blending ratio respectively to obtain a first array of the three color components of the pixels comprised in the locked content interface;
     multiplying the three color components of the pixels comprised in the unlocking interface by an inverse value of the blending ratio respectively to obtain a second array of the three color components of the pixels comprised in the unlocking interface;
     adding values of the three color components in the first array together with values of the three color components in the second array respectively according to the corresponding color components to obtain a third array of the three color components;
     merging the three color components of red, blue and green into each pixel to output according to values of the three color components in the third array; or
     dividing values of the three color components in the third array by the blending ratio to obtain a fourth array of the three color components, and merging the three color components of red, blue and green into each pixel to output according to values of the three color components in the fourth array.

2. The method according to claim 1, wherein, determining a blending ratio according to the correct degree value comprises:
   the correct degree value being proportional to the blending ratio, and correct degree values in a continuous interval corresponding to a blending ratio.

3. The method according to claim 1, wherein, presenting an unlocking interface to a user comprises:
receiving a triggering instruction input by the user, and presenting the unlocking interface to the user according to the triggering instruction.

4. A mobile terminal, comprising: a housing, a processor, a receiver, a memory, a circuit board and a power supply circuit, wherein,
the circuit board is enclosed by the housing;
the processor and the memory are positioned on the circuit board;
the power supply circuit is configured to provide power for respective circuits or components of the mobile terminal;
the memory is configured to store executable program codes;
the processor is configured to run a program corresponding to the executable program codes by reading the executable program codes stored in the memory, to perform the a method for displaying a locked interface; wherein the method comprises:
presenting an unlocking interface to a user, so that the user inputs an unlocking password through the unlocking interface;
in a process of receiving the unlocking password, comparing a received part of the unlocking password with a set unlocking password to determine a correct degree value of the received part of the unlocking password; and
displaying a locked content interface and/or the unlocking interface according to the correct degree value,
wherein displaying a locked content interface and/or the unlocking interface according to the correct degree value comprises:
displaying the unlocking interface when the correct degree value is less than a first threshold value, where the first threshold value is less than 100%;
determining a blending ratio according to the correct degree value when the correct degree value is between the first threshold value and 100%, and blending transparently the locked content interface with the unlocking interface according to the blending ratio to display a blended interface; and
displaying the locked content interface when the correct degree reaches 100%, and
the receiver is configured to receive the unlocking password;
wherein the processor is configured to blend transparently the locked content interface with the unlocking interface according to the blending ratio to display a blended interface by acts of:
separating three color components of red, blue and green of pixels comprised in the locked content interface and three color components of red, blue and green of pixels comprised in the unlocking interface;
multiplying the three color components of the pixels comprised in the locked content interface by the blending ratio respectively to obtain a first array of the three color components of the pixels comprised in the locked content interface;
multiplying the three color components of the pixels comprised in the unlocking interface by an inverse value of the blending ratio respectively to obtain a second array of the three color components of the pixels comprised in the unlocking interface;
adding values of the three color components in the first array together with values of the three color components in the second array respectively according to the corresponding color components to obtain a third array of the three color components;
merging the three color components of red, blue and green into each pixel to output according to values of the three color components in the third array; or dividing values of the three color components in the third array by the blending ratio to obtain a fourth array of the three color components, and merging the three color components of red, blue and green into each pixel to output according to values of the three color components in the fourth array.

5. A non-transitory computer-readable storage medium, configured to store one or more modules that, when the one or more modules are executed by an electronic device, cause the electronic device to perform a method for displaying a locked interface the method comprising:
presenting an unlocking interface to a user, so that the user inputs an unlocking password through the unlocking interface;
in a process of receiving the unlocking password, comparing a received part of the unlocking password with a set unlocking password to determine a correct degree value of the received part of the unlocking password; and
displaying a locked content interface and/or the unlocking interface according to the correct degree value,
wherein displaying a locked content interface and/or the unlocking interface according to the correct degree value comprises:
displaying the unlocking interface when the correct degree value is less than a first threshold value, where the first threshold value is less than 100%;
determining a blending ratio according to the correct degree value when the correct degree value is between the first threshold value and 100%, and blending transparently the locked content interface with the unlocking interface according to the blending ratio to display a blended interface; and
displaying the locked content interface when the correct degree reaches 100%;
wherein, blending transparently the locked content interface with the unlocking interface according to the blending ratio to display a blended interface comprises:
separating three color components of red, blue and green of pixels comprised in the locked content interface and three color components of red, blue and green of pixels comprised in the unlocking interface;
multiplying the three color components of the pixels comprised in the locked content interface by the blending ratio respectively to obtain a first array of the three color components of the pixels comprised in the locked content interface;
multiplying the three color components of the pixels comprised in the unlocking interface by an inverse value of the blending ratio respectively to obtain a second array of the three color components of the pixels comprised in the unlocking interface;
adding values of the three color components in the first array together with values of the three color components in the second array respectively according to the corresponding color components to obtain a third array of the three color components;

merging the three color components of red, blue and green into each pixel to output according to values of the three color components in the third array; or dividing values of the three color components in the third array by the blending ratio to obtain a fourth array of the three color components, and merging the three color components of red, blue and green into each pixel to output according to values of the three color components in the fourth array.

6. The mobile terminal according to claim 4, wherein, the correct degree value is proportional to the blending ratio, and correct degree values in a continuous interval correspond to a blending ratio.

7. The mobile terminal according to claim 4, wherein the processor is configured to present an unlocking interface to a user by acts of:
receiving a triggering instruction input by the user, and presenting the unlocking interface to the user according to the triggering instruction.

8. The non-transitory computer-readable storage medium according to claim 5, wherein, determining a blending ratio according to the correct degree value comprises:
the correct degree value being proportional to the blending ratio, and correct degree values in a continuous interval corresponding to a blending ratio.

9. The non-transitory computer-readable storage medium according to claim 5, wherein, presenting an unlocking interface to a user comprises:
receiving a triggering instruction input by the user, and presenting the unlocking interface to the user according to the triggering instruction.

\* \* \* \* \*